US012148364B2

(12) United States Patent
Yang et al.

(10) Patent No.: US 12,148,364 B2
(45) Date of Patent: Nov. 19, 2024

(54) LIGHT EMITTING DISPLAY DEVICE

(71) Applicant: MACROBLOCK, INC., Hsinchu (TW)

(72) Inventors: Li-Chang Yang, Hsinchu (TW); Yi-Sheng Lin, Hsinchu (TW)

(73) Assignee: MACROBLOCK, INC., Hsinchu (TW)

( * ) Notice: Subject to any disclaimer, the term of this patent is extended or adjusted under 35 U.S.C. 154(b) by 0 days.

(21) Appl. No.: 18/338,856

(22) Filed: Jun. 21, 2023

(65) Prior Publication Data

US 2024/0071294 A1 Feb. 29, 2024

(30) Foreign Application Priority Data

Aug. 25, 2022 (TW) ................................. 111132111
Jan. 3, 2023 (TW) ................................ 112100082

(51) Int. Cl.
*G09G 3/32* (2016.01)
*G09G 3/20* (2006.01)
(Continued)

(52) U.S. Cl.
CPC ............. *G09G 3/32* (2013.01); *G09G 3/2096* (2013.01); *G09G 3/3241* (2013.01);
(Continued)

(58) Field of Classification Search
CPC .. G09G 3/32; G09G 3/2096; G09G 2330/021; G09G 3/3241; G09G 3/3266; G09G 2300/0809; G09G 2310/0251
See application file for complete search history.

(56) References Cited

U.S. PATENT DOCUMENTS

2005/0264474 A1* 12/2005 Rast ..................... G09G 3/3216 345/55
2008/0030439 A1 2/2008 Shin
(Continued)

FOREIGN PATENT DOCUMENTS

CN 105938703 A 9/2016
TW 521237 B 2/2003
(Continued)

OTHER PUBLICATIONS

Search Report appended to an Office Action, which was issued to Taiwanese counterpart application No. 112100082 by the Taiwan Intellectual Property Office (TIPO) on Dec. 12, 2023, with an English translation thereof.
(Continued)

*Primary Examiner* — Nitin Patel
*Assistant Examiner* — Cory A Almeida
(74) *Attorney, Agent, or Firm* — Akerman LLP; Peter A. Chiabotti

(57) ABSTRACT

A light emitting display device includes a substrate, a drive power circuit, a gate circuit unit, multiple LEDs and a power switch unit. The power switch unit includes multiple first transistor switches and at least one second transistor switch that cooperatively control current flows through the LEDs. The first transistor switches are respectively connected to first terminals of the LEDs. The at least one second transistor switch is connected to second terminals of the LEDs. The first transistor switches are further connected to the drive power circuit to receive multiple drive currents, and are further connected to the gate circuit unit to receive a timing input. The at least one second transistor switch is further connected to the gate circuit unit to receive a timing input. The light emitting display device can have reduced parasitic
(Continued)

capacitance effect, and thus reduced power consumption and have improved display quality.

13 Claims, 3 Drawing Sheets

(51) Int. Cl.
*G09G 3/3241* (2016.01)
*G09G 3/3266* (2016.01)

(52) U.S. Cl.
CPC ... *G09G 3/3266* (2013.01); *G09G 2300/0809* (2013.01); *G09G 2310/0251* (2013.01); *G09G 2330/021* (2013.01)

(56) References Cited

U.S. PATENT DOCUMENTS

| | | | |
|---|---|---|---|
| 2012/0062528 A1 | 3/2012 | Kimura et al. | |
| 2021/0065613 A1* | 3/2021 | Chen | G09G 3/32 |

FOREIGN PATENT DOCUMENTS

| | | | |
|---|---|---|---|
| TW | 200813954 | A | 3/2008 |
| TW | 200941440 | A | 10/2009 |
| TW | 201537570 | A | 10/2015 |
| TW | I773312 | B | 8/2022 |

OTHER PUBLICATIONS

Search Report appended to an Office Action, which was issued to Taiwanese counterpart application No. 111132111 by the Taiwan Intellectual Property Office (TIPO) on Oct. 12, 2023, with an English translation thereof.

* cited by examiner

LIGHT EMITTING DISPLAY DEVICE

CROSS-REFERENCE TO RELATED APPLICATION

This application claims priority to Taiwanese Patent Application Nos. 111132111 and 112100082, respectively filed on Aug. 25, 2022 and Jan. 3, 2023.

FIELD

The disclosure relates to a display device, and more particularly to a light emitting diode display device.

BACKGROUND

Light emitting diodes (LEDs) have become the mainstream light source in recent years because of their advantages such as small size, high brightness, low heat generation, good power efficiency, etc. However, a conventional LED display device has large parasitic capacitance effect, and thus large power consumption and poor display quality.

SUMMARY

Therefore, an object of the disclosure is to provide a light emitting display device that can alleviate the drawback of the prior art.

According to the disclosure, the light emitting display device includes a substrate, a drive power circuit, a gate circuit unit, a plurality of light emitting diodes (LEDs) and a power switch unit. The drive power circuit is disposed on the substrate, and includes a plurality of power lines that extend along a first direction and that are arranged side by side along a second direction traverse to the first direction. The gate circuit unit is disposed on the substrate, and includes a first gate circuit and a second gate circuit. The first gate circuit includes a plurality of first gate lines that extend along the second direction and that are arranged side by side along the first direction. The second gate circuit includes a plurality of second gate lines that extend along the second direction and that are arranged side by side along the first direction. The LEDs are disposed on the substrate, and are arranged in a matrix. The power switch unit includes a plurality of first transistor switches and at least one second transistor switch that are directly formed on the substrate and that cooperatively control current flows through the LEDs. The first transistor switches are respectively connected to first terminals of the LEDs. The at least one second transistor switch is connected to second terminals of the LEDs. The first transistor switches are further connected to the drive power circuit to receive a plurality of drive currents, and are further connected to the first gate circuit to receive a timing input. The at least one second transistor switch is further connected to the second gate circuit to receive a timing input.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
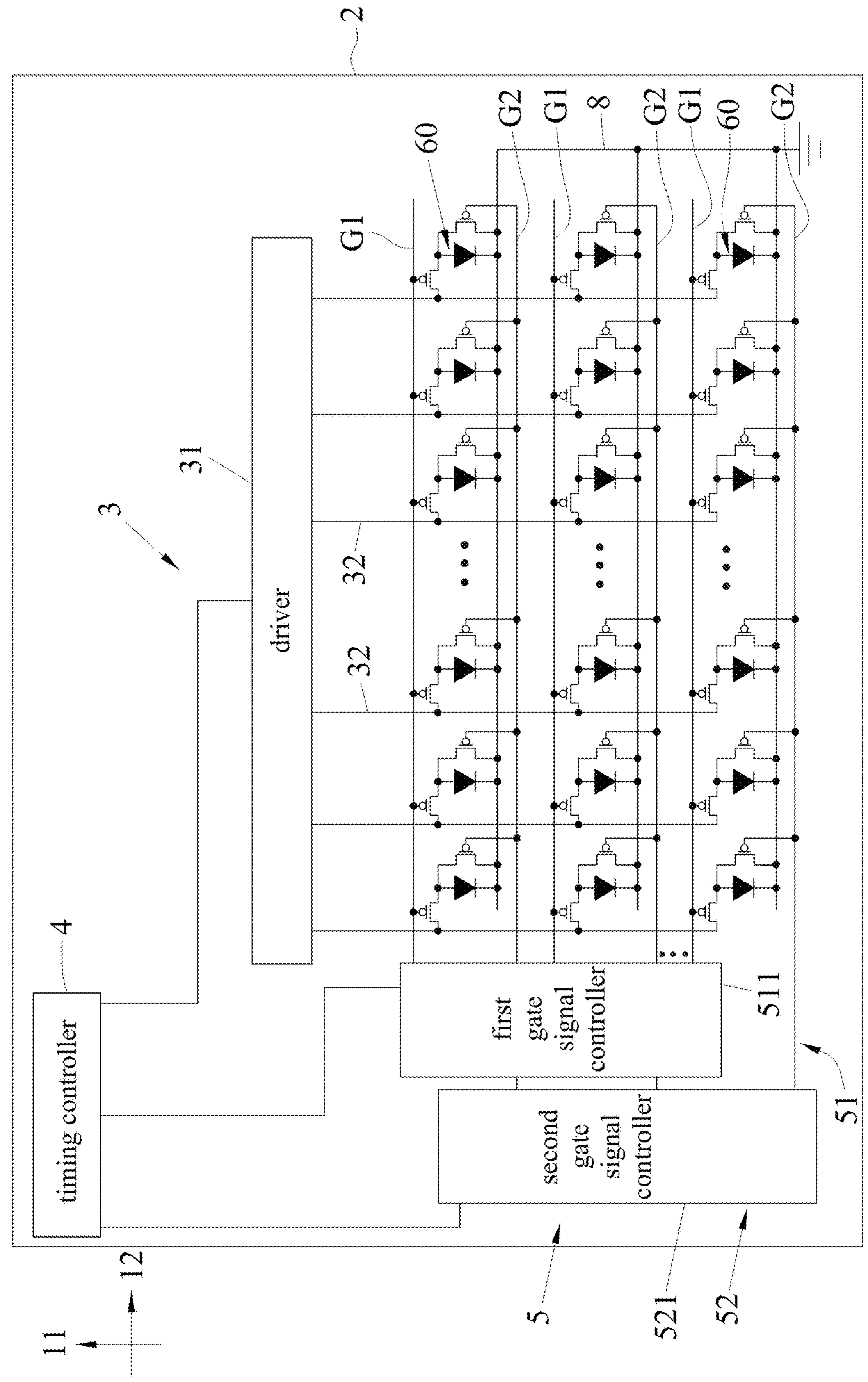
FIG. 1 is a schematic view illustrating a first embodiment of a light emitting display device according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
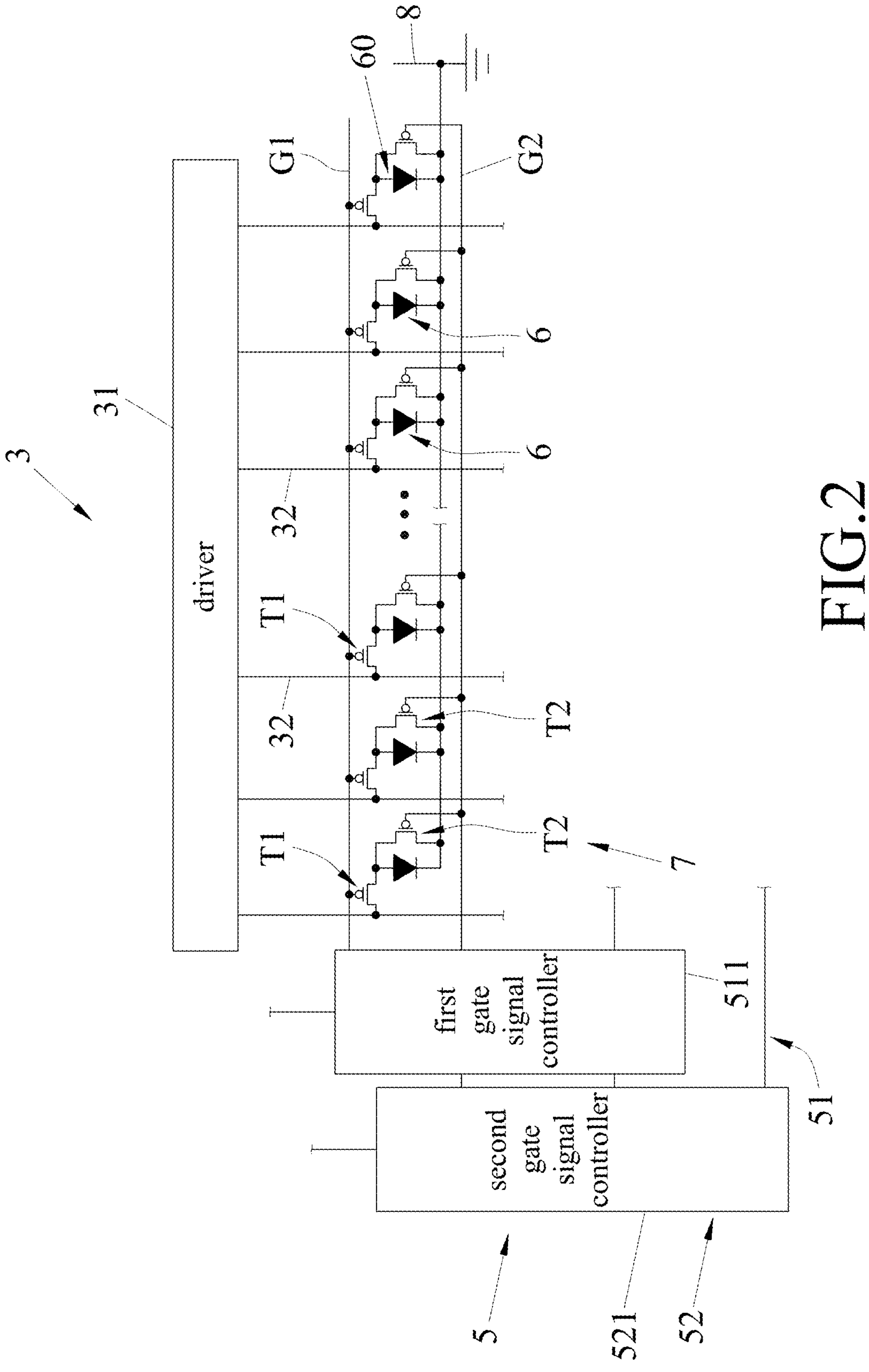
FIG. 2 is a schematic view illustrating a light emitting diode (LED) unit of the first embodiment.

Referring to FIGS. 1 and 2, a first embodiment of a light emitting display device according to the disclosure includes a substrate 2, a drive power circuit 3, a timing controller 4, a gate circuit unit 5, a plurality of light emitting diodes (LEDs) 6, a power switch unit 7 and a ground circuit 8.

The substrate 2 is selected from a silicon substrate, a glass substrate and a flexible substrate.

The drive power circuit 3 and the timing controller 4 are disposed on the substrate 2. The drive power circuit 3 includes a driver 31 that is connected to the timing controller 4, and a plurality of power lines 32 that are connected to the driver 31. The power lines 32 extend along a first direction 11, are arranged side by side along a second direction 12 traverse to the first direction 11, and are spaced apart from each other. The timing controller 4 is configured to provide timing signals. The driver 31 is configured to receive timing signals from the timing controller 4, and to provide and control a plurality of drive currents respectively to the power lines 32 based on the timing signals. For illustration purposes, the first direction 11 is the (Y) direction and the second direction 12 is the (X) direction in this embodiment, but the disclosure is not limited to such configuration.

The gate circuit unit 5 is disposed on the substrate 2, and includes a first gate circuit 51 and a second gate circuit 52. The first gate circuit 51 includes a first gate signal controller 511 that is connected to the timing controller 4, and a plurality of first gate lines (G1) that are connected to the first gate signal controller 511. The second gate circuit 52 includes a second gate signal controller 521 that is connected to the timing controller 4, and a plurality of second gate lines (G2) that are connected to the second gate signal controller 512.

Specifically, the first gate lines (G1) and the second gate lines (G2) extend along the second direction 12, and are spaced apart from each other. The first gate lines (G1) are arranged alternatingly with the second gate lines (G2) along the first direction 11. The power lines 32, the first gate lines (G1) and the second gate lines (G2) cooperatively define a plurality of placement areas. The placement areas are arranged in a matrix that has a plurality of rows in the second direction 12 and a plurality of columns in the first direction 11.

The LEDs 6 are disposed on the substrate 2 and respectively in the placement areas. With respect to each of the rows, the LEDs 6 in the row cooperatively constitute an LED unit 60 that corresponds to the row. It should be noted that, the LEDs 6 may be directly formed on the substrate 2 by a semiconductor fabrication process. Alternatively, the LEDs 6 may be placed on the substrate 2 by first forming the LEDs 6 on an original epitaxial substrate and then transferring the LEDs 6 in the form of unpackaged or packaged dies to the substrate 2 one at a time or multiple at a time. Alternatively, the LEDs 6 may be placed on the substrate 2 by first aligning and forming the LEDs 6 on at least one transparent substrate and then aligning and placing the LEDs 6 on the substrate 2 using a flip-chip method, so the LEDs 6 are sandwiched between the at least one transparent substrate and the substrate 2, and light emitted by the LEDs 6 will penetrate the at least one transparent substrate to be emitted outside. By transferring the LEDs 6 to the substrate 2 in batches or all at one time, the number of transfers can be reduced to achieve time efficiency, and tolerance problems such as misalignment of the LEDs 6 can be prevented. In addition, when multiple LEDs 6 are transferred to the substrate 2 each time, the LEDs 6 in each of the rows can be connected to each other in a common cathode configuration or in a common anode configuration, and the driver 31 may provide and control the drive currents for driving the LEDs 6 in a way that is dependent on the connection configuration of the LEDs 6.

It should also be noted that the LEDs 6 may emit light of different wavelengths by using different light-emitting materials. For example, the LEDs 6 may at least emit red light, blue light and green light. Alternatively, the LEDs 6 may be made of the same short-wavelength light-emitting material (blue or ultraviolet light-emitting material) to emit light of the same color, and different light-converting materials such as fluorescent powders, quantum dots, etc. are used to perform wavelength conversion so as to attain lights of different colors (e.g., red, blue, green, etc.). Material selection and detailed structure of the LEDs 6 are well known to those skilled in the art, and are omitted herein for the sake of brevity.

The power switch unit 7 includes a plurality of first transistor switches (T1) and a plurality of second transistor switches (T2). The first transistor switches (T1) and the second transistor switches (T2) cooperatively control current flows through the LEDs 6.

The first transistor switches (T1) are respectively connected to first terminals of the LEDs 6. Second terminals of the LEDs 6 of each of the LED units 60 that respectively correspond to the rows are connected to at least one of the second transistor switches (T2). The first transistor switches (T1) are further connected to the drive power circuit 3 to receive the drive currents, and are further connected to the first gate circuit 51 to receive a timing input that contains a plurality of timing signals. The second transistor switches (T2) are further connected to the second gate circuit 52 to receive a timing input that contains a plurality of timing signals. In this embodiment, the second transistor switches (T2) respectively correspond to the LEDs 6.

It should be noted that each of the first transistor switches (T1) and the second transistor switches (T2) is a field effect transistor (FET). For example, each of the first transistor switches (T1) and the second transistor switches (T2) is in the form of a thin film transistor (TFT), and is directly formed on the substrate 2 by a semiconductor fabrication process. A type of each of the first transistor switches (T1) and the second transistor switches (T2) is dependent on a material of the substrate 2. For example, when the substrate 2 is a glass substrate and a material deposited on a surface of the substrate 2 is amorphous silicon, each of the first transistor switches (T1) and the second transistor switches (T2) can only be an N-type TFT; when the substrate 2 is a glass substrate and the material deposited on the surface of the substrate 2 is low temperature polycrystalline silicon (LTPS), each of the first transistor switches (T1) and the second transistor switches (T2) can be any one of an N-type TFT and a P-type TFT; and when the substrate 2 is a silicon substrate, each of the first transistor switches (T1) and the second transistor switches (T2) can be any one of an N-type TFT and a P-type TFT. Material selection of the first transistor switches (T1) and the second transistor switches (T2) and the semiconductor fabrication process for forming the first transistor switches (T1) and the second transistor switches (T2) are well known to those skilled in the art, and are omitted herein for the sake of brevity.

FIGS. 1 and 2 depict an implementation where each of the first transistor switches (T1) and the second transistor switches (T2) is a P-type TFT. The first terminal of each of the LEDs 6 is an anode. The second terminal of each of the LEDs 6 is a cathode. The LEDs 6 of each of the LED units 60 are connected to each other in the common cathode configuration. The anodes of the LEDs 6 are respectively connected to drain terminals of the first transistor switches (T1), and are respectively connected to source terminals of the second transistor switches (T2). The columns respectively correspond to the power lines 32. With respect to each of the columns, source terminals of the first transistor switches (T1) that are respectively connected to the LEDs 6 in the column are connected to the power line 32 that corresponds to the column, so as to receive the drive current provided on the power line 32. The rows respectively correspond to the first gate lines (G1), and respectively correspond to the second gate lines (G2). With respect to each of the rows, gate terminals of the first transistor switches (T1) that are respectively connected to the LEDs 6 in the row are connected to the first gate line (G1) that corresponds to the row, so as to receive a timing signal; gate terminals of the second transistor switches (T2) that are respectively connected to the LEDs 6 in the row are connected to the second gate line (G2) that corresponds to the row, so as to receive a timing signal; and the cathodes of the LEDs 6 in the row and drain terminals of the second transistor switches (T2) that respectively correspond to the LEDs 6 in the row are connected to the ground circuit 8 that is disposed on the substrate 2.

In the implementation depicted in FIGS. 1 and 2, the light emitting display device performs time multiplexed scan and constant current drive. Specifically, the driver 31 is operable, based on timing signals received from the timing controller 4, to provide or not to provide drive currents with a constant magnitude respectively to the power lines 32. The first gate signal controller 511 and the second gate signal controller 521 cooperatively turn on and turn off the first transistor switches (T1) and the second transistor switches (T2) in such a way that the LEDs 6 emit light row by row (sequentially without overlapping in time). That is, the first gate signal controller 511 turns on the first transistor switches (T1) respectively connected to the LEDs 6 that are to emit light, and turns off the first transistor switches (T1) respectively connected to the LEDs that are not to emit light, and the second gate signal controller 521 turns off the second transistor switches (T2) respectively connected to the LEDs 6 that are to emit light, and turns on the second transistor switches (T2) respectively connected to the LEDs 6 that are not to emit light, so the LEDs 6 that are to emit light respectively receives the drive currents. In a scenario where a frame rate of the light emitting display device is 60 Hz and a total number of the rows is 180 (i.e., a scan time of the light emitting display device=$1/(60\times180)$ s=92.59 μs), each of the power lines 32 is electrically connected to one LED 6 instead of 180 LEDs 6 at a time, so parasitic capacitance effect can be reduced, thereby reducing power consumption of the light emitting display device and improving display quality of the light emitting display device.

It should be noted that the implementation depicted in FIGS. 1 and 2 may be modified in a way that will be described below. In the modification of the implementation depicted in FIGS. 1 and 2, each of the first transistor switches (T1) and the second transistor switches (T2) is an N-type TFT. The anodes of the LEDs 6 are respectively connected to the source terminals of the first transistor switches (T1), and are respectively connected to the drain terminals of the second transistor switches (T2). With respect to each of the columns, the drain terminals of the first transistor switches (T1) that respectively connect the LEDs 6 in the column are connected to the power line 32 that corresponds to the column. With respect to each of the rows, the cathodes of the LEDs 6 in the row and the source terminals of the second transistor switches (T2) that respectively correspond to the LEDs 6 in the row are connected to the ground circuit 8.

Figure 3:
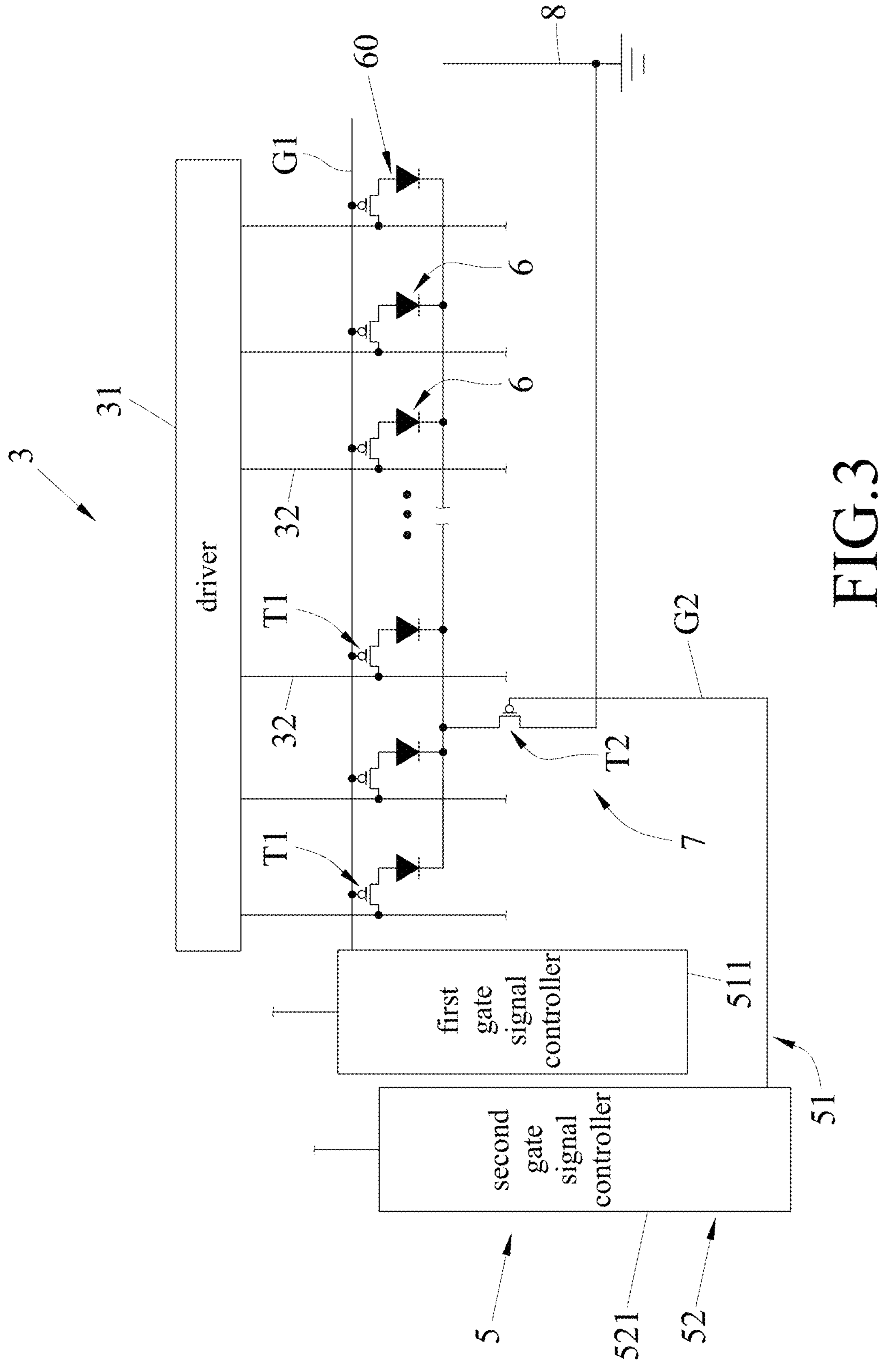
FIG. 3 is a schematic view illustrating the LED unit of a second embodiment of the light emitting display device according to the disclosure.

Referring to FIG. 3, a second embodiment of the light emitting display device according to the disclosure is similar to the first embodiment, but differs from the first embodiment in the structure of the power switch unit 7.

In the second embodiment, the second transistor switches (T2) respectively correspond to the rows. With respect to each of the rows, the LEDs 6 in the row are connected to the second transistor switch (T2) that corresponds to the row. FIG. 3 depicts an implementation where each of the first transistor switches (T1) and the second transistor switches (T2) is a P-type transistor. With respect to each of the rows, the source terminal of the second transistor switch (T2) that corresponds to the row is connected to the cathodes of the LEDs 6 in the row, the drain terminal of the second transistor switch (T2) that corresponds to the row is connected to the ground circuit 8, and the gate terminal of the second transistor switch (T2) that corresponds to the row is connected to the second gate line (G2) that corresponds to the row so as to receive a timing signal. Even when the LEDs 6 in the same row share a same second transistor switch (T2), the parasitic capacitance effect can be reduced, thereby reducing the power consumption of the light emitting display device and improving the display quality of the light emitting display device.

Referring to FIGS. 1 to 3, in view of the above, in each of the aforesaid embodiments, since the power switch unit 7 for controlling the current flows through the LEDs 6 is directly formed on the substrate 2 by a semiconductor fabrication process, and since each first transistor switch (T1) is connected between the corresponding power line 32 and the respective LED 6, each of the power lines 32 is electrically connected to one LED 6 at a time during the time multiplexed scan, so the parasitic capacitance effect can be reduced, thereby reducing the power consumption of the light emitting display device and improving the display quality of the light emitting display device so as to facilitate application of the light emitting display device.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A light emitting display device comprising:

a substrate;

a drive power circuit disposed on said substrate, and including a plurality of power lines that extend along a first direction and that are arranged side by side along a second direction traverse to the first direction;

a gate circuit unit disposed on said substrate, and including a first gate circuit and a second gate circuit, said first gate circuit including a plurality of first gate lines that extend along the second direction and that are arranged side by side along the first direction, said second gate circuit including a plurality of second gate lines that extend along the second direction and that are arranged side by side along the first direction;

a plurality of light emitting diodes (LEDs) disposed on said substrate, and arranged in a matrix; and a power switch unit including a plurality of first transistor switches and at least one second transistor switch that are directly formed on said substrate and that cooperatively control current flows through said LEDs, a total number of said first transistor switches being equal to a total number of said LEDs, drain terminals of said first transistor switches being directly connected to first terminals of said LEDs in a one-to-one relationship, and being not directly connected to said drive power circuit, said at least one second transistor switch being connected to second terminals of said LEDs;

wherein said first transistor switches are further connected to said drive power circuit to receive a plurality of drive currents, and are further connected to said first gate circuit to receive a timing input;

wherein said at least one second transistor switch is further connected to said second gate circuit to receive a timing input.

2. The light emitting display device as claimed in claim 1, wherein:

said power switch unit includes a plurality of said second transistor switches;

the matrix has a plurality of rows in the second direction; and with respect to each of said rows, said second terminals of said LEDs in said row are connected to at least one of said second transistor switches.

3. The light emitting display device as claimed in claim 2, further comprising a ground circuit that is disposed on said substrate and that is connected to said second transistor switches.

4. The light emitting display device as claimed in claim 3, wherein:

said first terminal of each of said LEDs is an anode;

said second terminal of each of said LEDs is a cathode;

gate terminals of said first transistor switches are connected to said first gate circuit;

source terminals of said first transistor switches are connected to said drive power circuit; and gate terminals of said second transistor switches are connected to said second gate circuit.

5. The light emitting display device as claimed in claim 3, wherein:

said second transistor switches respectively correspond to said LEDs; and with respect to each of said second transistor switches, a source terminal of said second transistor switch is connected to said first terminal of said LED that corresponds to said second transistor switch, and a drain terminal of said second transistor switch is connected to said ground circuit and said second terminal of said LED that corresponds to said second transistor switch.

6. The light emitting display device as claimed in claim 5, wherein, with respect to each of said rows, said source terminals of said second transistor switches that are respectively connected to said LEDs in said row are connected to each other, and are further connected to said ground circuit.

7. The light emitting display device as claimed in claim 3, wherein:

said second transistor switches respectively correspond to said rows; and with respect to each of said second transistor switches, a source terminal of said second transistor switch is connected to said second terminals of said LEDs in said row that corresponds to said second transistor switch, and a drain terminal of said second transistor switch is connected to said ground circuit.

8. The light emitting display device as claimed in claim 2, wherein:

said matrix has a plurality of columns that are in the first direction and that respectively correspond to said power lines;

said rows respectively correspond to said first gate lines, and respectively correspond to said second gate lines;

with respect to each of said rows, gate terminals of said first transistor switches that are respectively connected to said LEDs in said row are connected to said first gate line that corresponds to said row, and gate terminal(s) of said at least one of said second transistor switches that is (are) connected to said LEDs in said row is (are) connected to said second gate line that corresponds to said row; and with respect to each of said columns, source terminals of said first transistor switches that are respectively connected to said LEDs in said column are connected to said power line that corresponds to said column.

9. The light emitting display device as claimed in claim 2, wherein said LEDs in each of said rows are connected to each other in one of a common cathode configuration and a common anode configuration.

10. The light emitting display device as claimed in claim 9, wherein:

said drive power circuit further includes a driver; and said driver is connected to said power lines, and is configured to provide and control the drive currents respectively to said power lines in a way dependent on the connection configuration of said LEDs.

11. The light emitting display device as claimed in claim 1, further comprising a timing controller that is connected to said drive power circuit and said gate circuit unit.

12. The light emitting display device as claimed in claim 1, wherein:

said substrate is selected from a glass substrate, a silicon substrate and a flexible substrate; and said power switch unit is directly formed on said substrate by a semiconductor fabrication process.

13. The light emitting display device as claimed in claim 1, wherein each of said LEDs is a packaged die.

* * * * *